United States Patent
Borenstein et al.

(10) Patent No.: US 7,249,516 B2
(45) Date of Patent: Jul. 31, 2007

(54) METHOD OF OPERATING A RESISTIVE HEAT-LOSS PRESSURE SENSOR

(75) Inventors: Michael D. Borenstein, Boulder, CO (US); Paul C. Arnold, Boulder, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 11/146,721

(22) Filed: Jun. 7, 2005

(65) Prior Publication Data

US 2006/0021442 A1  Feb. 2, 2006

Related U.S. Application Data

(63) Continuation of application No. 11/070,819, filed on Mar. 1, 2005, which is a continuation-in-part of application No. 10/900,504, filed on Jul. 28, 2004, now abandoned.

(51) Int. Cl.
*G01L 9/02* (2006.01)

(52) U.S. Cl. ............... 73/719; 73/734; 73/750; 73/725; 73/746

(58) Field of Classification Search .......... 73/755, 73/719, 725, 734, 750, 746
See application file for complete search history.

(56) References Cited

U.S. PATENT DOCUMENTS

| | | | |
|---|---|---|---|
| 1,448,540 A | 3/1923 | Houskeeper |
| 1,668,106 A | 5/1928 | Dallenback |
| 1,778,508 A | 10/1930 | Peoples |
| 1,873,984 A | 8/1932 | Sieber |
| 2,938,387 A | 5/1960 | Hamilton |
| 3,066,537 A | 12/1962 | Rivera |
| 3,199,356 A | 8/1965 | Andriulis |
| 3,580,081 A | 5/1971 | Greenberg et al. |
| 3,609,728 A | 9/1971 | Quinn et al. |
| 3,794,885 A | 2/1974 | Kishi et al. |
| 4,106,350 A | 8/1978 | Morris et al. |
| 4,159,428 A | 6/1979 | Antonov et al. |
| 4,279,147 A | 7/1981 | Djorup |
| 4,448,078 A | 5/1984 | Bridges |
| 4,492,123 A | 1/1985 | Reich |
| 4,541,286 A | 9/1985 | Holme |
| 4,579,002 A | 4/1986 | Zettler |
| 4,682,503 A | 7/1987 | Higashi et al. |
| 4,736,155 A | 4/1988 | McBrien |
| 4,787,251 A | 11/1988 | Kolodjski |

(Continued)

FOREIGN PATENT DOCUMENTS

GB   156 525 A   12/1921

(Continued)

*Primary Examiner*—Andre J. Allen
(74) *Attorney, Agent, or Firm*—Hamilton, Brook, Smith & Reynolds, P.C.

(57) ABSTRACT

In a resistively heated heat-loss pressure gauge, electrical current is switched between a sensing element and a compensating element at different duty cycles. As a result, the sensing element is heated relative to the compensating element. A fixed resistance is placed in series with at least the compensating element. The current source applies current to heat the sensing element to a temperature at which the resistance of the sensing element matches the combined resistance of the compensating element and the fixed resistive element.

23 Claims, 5 Drawing Sheets

U.S. PATENT DOCUMENTS

| | | |
|---|---|---|
| 4,964,158 A | 10/1990 | Okochi et al. |
| 4,995,264 A | 2/1991 | Stocker et al. |
| 5,079,954 A | 1/1992 | O'Neal, III |
| 5,184,500 A | 2/1993 | Krema |
| 5,347,869 A | 9/1994 | Shie et al. |
| 5,465,604 A | 11/1995 | Sherman |
| 5,557,972 A | 9/1996 | Jacobs et al. |
| 5,597,957 A | 1/1997 | Schieferdecker et al. |
| 5,608,168 A | 3/1997 | Schoroth |
| 5,668,320 A | 9/1997 | Cowan |
| 5,693,888 A | 12/1997 | Enderes et al. |
| 5,832,772 A | 11/1998 | McEwan |
| 5,909,132 A | 6/1999 | Trofimenkoff et al. |
| 5,962,791 A | 10/1999 | Walchli et al. |
| 6,023,979 A | 2/2000 | Bills et al. |
| 6,227,056 B1 | 5/2001 | Bills et al. |
| 6,433,524 B1 | 8/2002 | Yang et al. |
| 6,474,172 B1 | 11/2002 | Rolff et al. |
| 6,553,318 B2 | 4/2003 | Mansky |
| 6,591,683 B1 | 7/2003 | Yutani et al. |
| 6,658,941 B1 | 12/2003 | Bills et al. |
| 2003/0038614 A1 | 2/2003 | Walters et al. |
| 2003/0097876 A1 | 5/2003 | Bills et al. |
| 2004/0020301 A1 | 2/2004 | Borenstein |

FOREIGN PATENT DOCUMENTS

| | | |
|---|---|---|
| WO | WO 97/41414 A | 11/1997 |
| WO | WO 02/35893 A1 | 5/2002 |

METHOD OF OPERATING A RESISTIVE HEAT-LOSS PRESSURE SENSOR

RELATED APPLICATIONS

This application is a continuation of U.S. application Ser. No. 11/070,819, filed Mar. 1, 2005, which is a continuation-in-part of U.S. application Ser. No. 10/900,504, filed Jul. 28, 2004 now abandoned. The entire teachings of the above applications are incorporated herein by reference.

BACKGROUND OF THE INVENTION

The rate of heat transfer through a gas is a function of the gas pressure. Thus, under certain conditions, measurements of heat transfer rates from a heated sensing element can, with appropriate calibration, be used to determine the gas pressure. This principal is used in the well-known Pirani gauge.

Many Pirani gauges comprise temperature sensitive sensing and compensating resistances in separate legs of a Wheatstone bridge. The compensating resistance is sized to minimize self-heating with current applied through the two resistances. The resultant resistance differences with heating of the sensing resistor is indicative of pressure of the surrounding environment.

In more recent heat loss gauge implementations presented in U.S. Pat. No. 6,658,941, the sensing element and compensating element are of like dimensions, but an additional heating current is applied to the sensing element to boost its temperature. Again, the relative resistances of the sensing and compensating elements with increase in temperature of the sensing element are indicative of the pressure of the surrounding environment. One implementation relies on a Wheatstone bridge, while another relies on a fixed ratio of current flow through the resistive elements under control of a feedback circuit responsive to the sensed resistances.

SUMMARY OF THE INVENTION

The present invention relates to an improvement to a heat-loss gauge which has the potential of providing higher performance at a reduced cost due to the ability to rely on less precise components. Rather than controlling current source ratios as in an implementation of U.S. Pat. No. 6,658,941, the present system controls power to the sensing and compensating elements using asymmetrical switching techniques.

An electrical source is connected to switch current between the sensing element and compensating element, preferably from a common current source. Current is applied to the sensing element over a longer duty cycle to heat the sensing element relative to the compensating element. Measuring circuitry determines gas pressure in the environment to which the elements are exposed based on electrical response of the sensing element and the compensating element.

In certain embodiments, current is applied to the sensing element and compensating element at fixed duty cycles and current level is controlled. In other embodiments, the applied current is fixed and duty cycle of current to at least one of the sensing element and compensating element is controlled. In yet other embodiments, both the current and the duty cycles are controlled.

The gas pressure may be determined based on the level of heating current through the sensing element and/or the resulting voltage across the sensing element.

In various embodiments, the compensating element is in series with a fixed resistive element. The electrical source applies current to heat the sensing element to a temperature at which the resistance of the sensing element matches the combined resistance of the compensating element and the fixed resistive element. In certain embodiments, the fixed resistive element is only in series with the compensating element, and the voltage across the compensating element and fixed resistive element is compared to a voltage across the sensing element to control the switched current. In other embodiments, the fixed resistive element is in series with both the sensing element and the compensating element, and the voltage across the fixed resistive elements is added to the voltage across the compensating element and fixed resistive element for comparison to a voltage across the sensing element and fixed resistive element.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
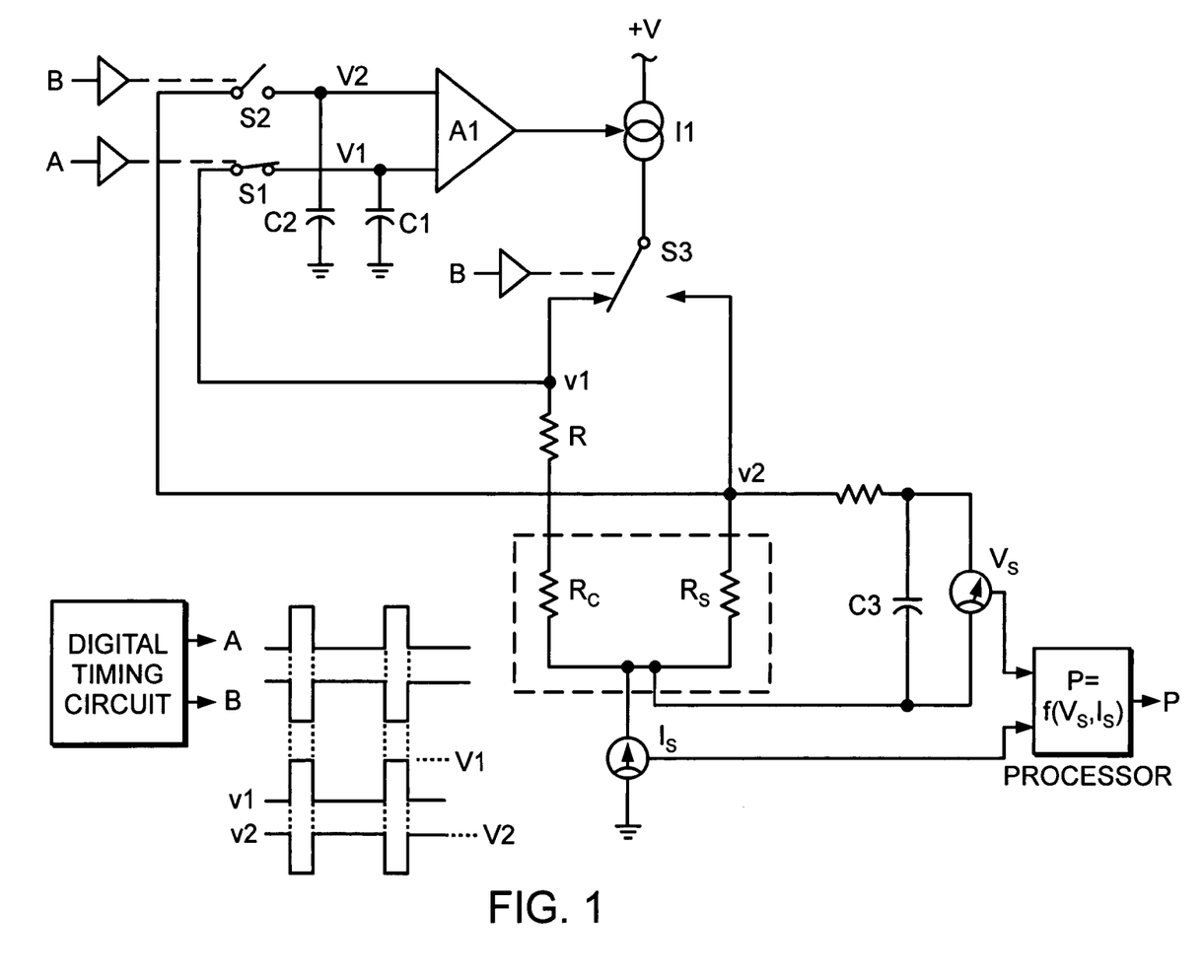
FIG. 1 shows one embodiment of the present invention.

FIG. 1 is a simplified diagram of control and measuring circuitry embodying the invention. The purpose of the sensor control circuit is to cause the temperature of the sensing element Rs to be maintained at a precise fixed amount above the temperature of the compensating element Rc. The voltage across the sensing element and/or current through the sensing element required to do this are measured and then converted into a pressure in a manner described in U.S. Pat. Nos. 6,023,979 and 6,658,941 which are incorporated by reference in their entirety. Current from the dependent current source I1 is alternately switched through the sensing element Rs and the compensating element Rc using switch S3. The time during each cycle that the current flows through the sensing element Rs is greater in proportion to the time that the current flows through the compensating element Rc. Thus, the average power dissipated in Rs is greater than that dissipated in Rc, causing Rs to rise to a higher temperature than Rc.

At low pressures heat does not conduct as readily from the resistor to the surrounding environment. As a result, at low pressures, the resistance Rs will increase to a greater amount with a given input, or will require a lesser power input to increase to a given resistance. The extent to which the resistance Rs increases over the resistance Rc is readily determined by connecting a non-temperature dependent differential resistance Rd in series with Rc and driving the resistance Rs to a level at which Rs equals Rc plus Rd. The electrical input required to maintain that equality of resistances can then be used to compute pressure. Alternative approaches might, for example, rely on measurements of Rs and Rc that are digitized and processed in a microprocessor without the series resistance Rd.

The cycle period of this process is kept much shorter than the thermal time constant of the sensor wires so that the temperatures, and therefore the resistances, of the elements do not change as the current is switched back and forth.

A fixed resistor Rd is inserted in series with Rc to form a sum of a temperature-dependent and a non-temperature-dependent resistance. When switch S3 is passing the current from current source I1 through Rc, S1 closes and charges capacitor C1 to the peak voltage V1 present at the top of Rd (signal v1). Then, when S3 switches the current from I1 to Rs, S1 opens and S2 closes, charging capacitor C2 to the peak voltage V2 present at the top of Rs (signal v2). Thus, the voltages V1 and V2 are charged to the peak values of signals v1 and v2.

Since the low sides of Rs and Rc are connected together, V1 will equal V2 when the resistance of Rs=Rc+Rd. The difference V1−V2 is amplified in the high-gain integrating amplifier A1 which drives the dependent current source I1 to the proper level to maintain the conditions of equal voltages and equal resistances. The gain of amplifier A1 is sufficiently high to keep the error between V1 and V2 negligible, and the time response of amplifier A1 is slow enough to assure that current source I1 cannot change value during the switching cycle time.

Current meter Is measures the sensing element current. For a steady pressure in the gauge, amplifier A1 holds the current of I1 equal for both parts of the switching cycle, causing the current through meter Is to be a steady DC level equal to that of the current of source I1. Thus, the current measured in current meter Is is equal to the peak sensing element current Is, which is equal to the current of source I1. The average voltage across Rs is developed across C3 of an RC filter with a time constant somewhat longer than the cycle time of the current switching cycle. The average sensing element voltage Vs and the current Is are converted to a digital format using standard A/D conversion techniques. A digital processor then calculates pressure as a function of Vs and Is using an algorithm that was developed using empirical 3-D surface fitting techniques as described in U.S. Pat. Nos. 6,023,979 and 6,658,941.

The present switched design allows for a reduction in the precision components which were used in the implementation of FIG. 7 of U.S. Pat. No. 6,658,941. In the prior design, two current sources had precise current ratios. To that end, matched dual operational amplifiers and precision resistances were used. Also, precision resistances were used to provide accurate multiplier ratios in a feedback circuit that controlled the current sources. In the present design, a single current source applies the current to both legs of the circuit. Further, voltages v1 and v2 are provided directly back to the amplifier A1 without the need to have one divided relative to the other. Rather than precisely controlling ratios of currents and voltages, the present design relies on time ratios that are easily controlled by low-cost digital circuits.

Figure 2:
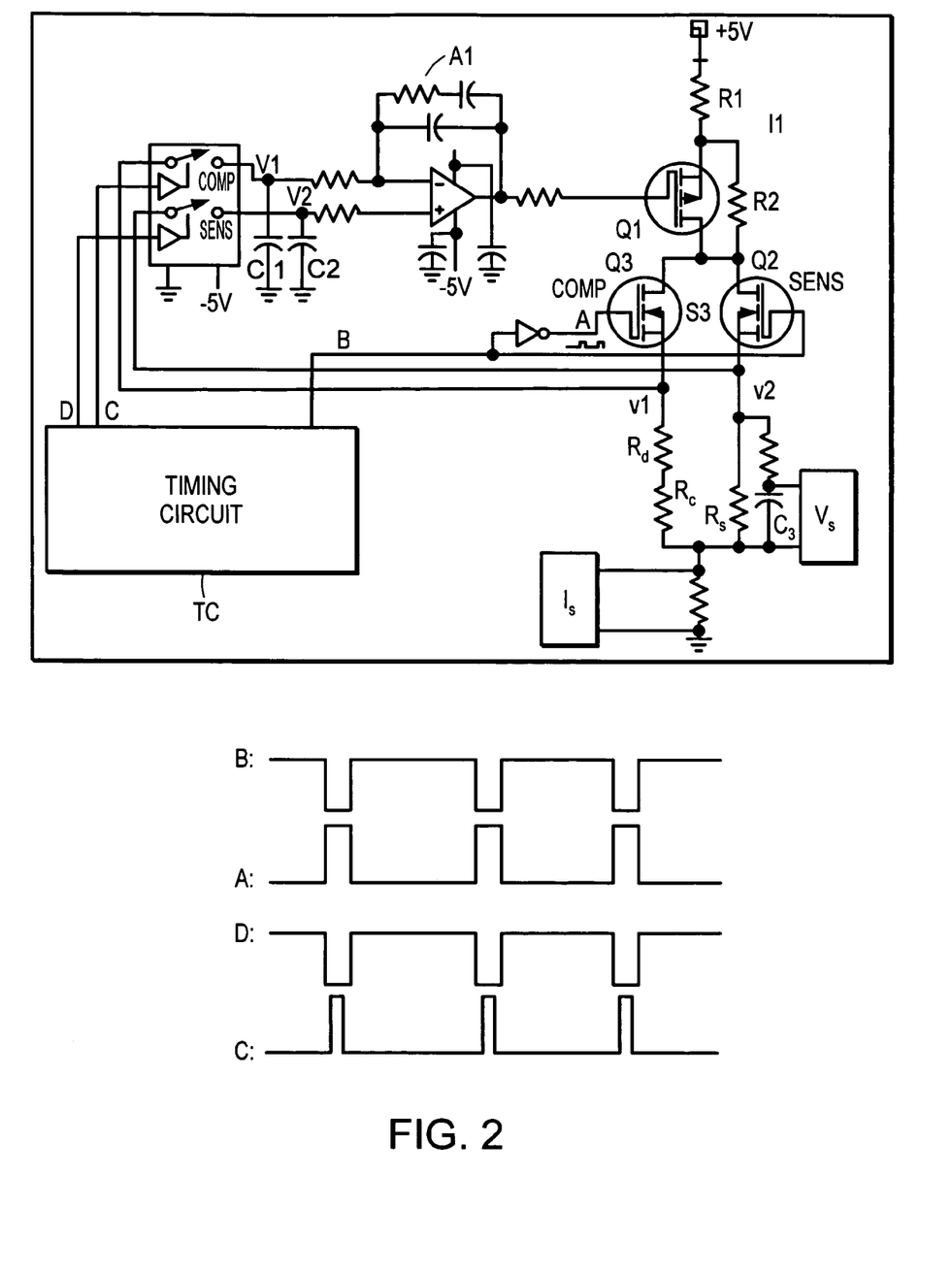
FIG. 2 shows the embodiment of FIG. 1 in greater detail.

The actual functioning circuit design is shown in FIG. 2. In this circuit, a timing circuit generates digital timing signals B, C and D to guarantee that S1 closes after the current switches to the compensating element and opens before the current switches to the sensing element, and S2 closes after the current switches to the sensing element and opens before the current switches to the compensating element.

In this circuit, the current source I1 is comprised of an FET Q1 and resistors R1 and R2. The switch S3 comprises FETs Q2 and Q3 driven by respective timing signals B and A. It was found from experimental data that a cycle frequency above 3 kHz eliminated thermal time constant issues, and frequency was chosen to be 10 kHz. The switching duty cycle was set at 25% for the compensating element and 75% for the sensing element. Although duty cycles up to nearly 50% will work, a shorter duty cycle reduces undesirable self-heating of the compensating element.

With duty cycles of 25% or less, the compensating element temperature can be kept close to the ambient envelope temperature of the device, minimizing unnecessary power dissipation and case temperature rise. Note that the power dissipation, and therefore the temperature rise of the compensating element is slightly less (about 80%) than 1/(compensator-to-sensor time ratio)$^2$ of the sensing element. For example, if the sensing element is running at a temperature rise of 70° C., and the compensating element is powered 20% of the time, the compensating element will be conducting current ¼ as long as the sensing element, and its temperature rise will be about 0.8×(¹⁄₁₆)×70° C.=3.5° C.

Figure 3:
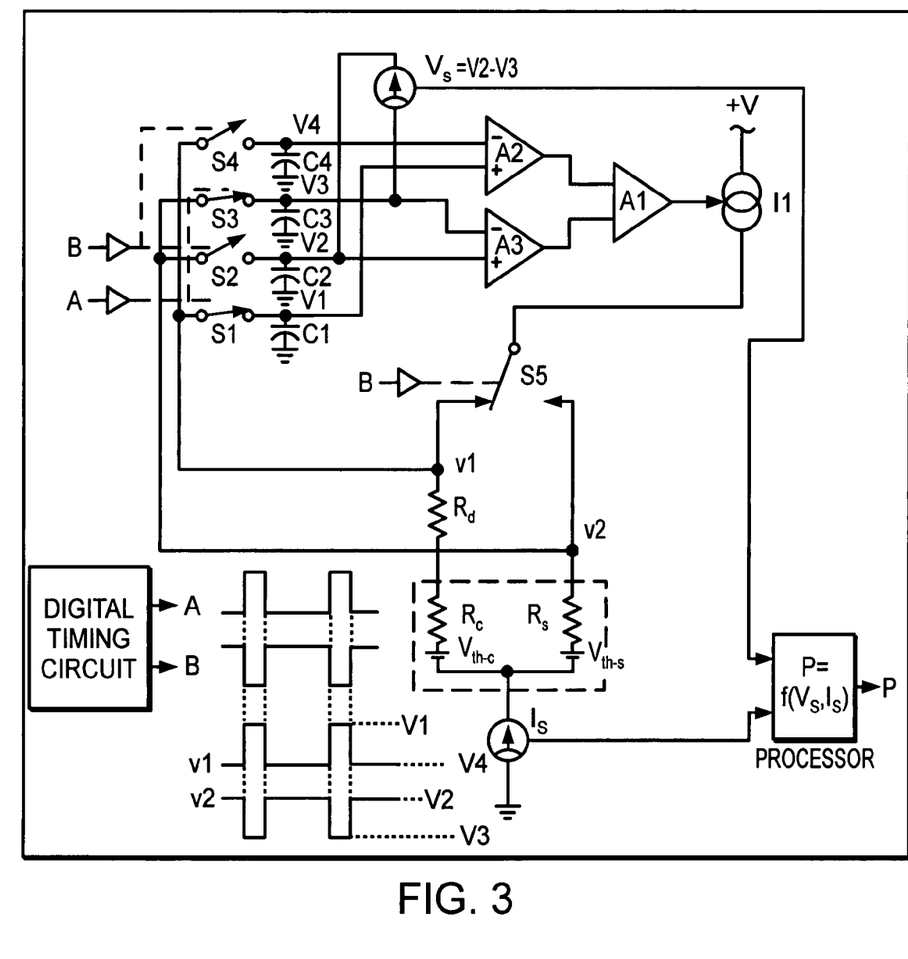
FIG. 3 illustrates another embodiment of the invention designed to reduce thermoelectric effects using a synchronous detection technique.

Temperature gradients on the transducer and interconnect wiring can produce small DC errors in the control and measurement circuits, resulting in pressure measurement errors and instabilities. These thermoelectric effects are illustrated in FIG. 3 as voltage sources $V_{th-c}$ and $V_{th-s}$. The method described above can be further improved so that these thermoelectric effects can be eliminated using a.c. synchronous detection schemes. Since current is alternately switched between the two elements, the voltage across each element can be detected during each respective cycle state. The difference between the two detected voltages developed across a given element provides a more accurate resistance and heating voltage measurement since the residual thermoelectric error voltages are present in both readings and therefore cancelled out.

This method works similarly to the one described in FIG. 1 with the following additional features. During the time period that signal v1 is sampled and held, storing V1 on capacitor C1, signal v2 is simultaneously sampled and held, storing V3 on C3. Then, when signal v2 is sampled and held, storing V2 on capacitor C2, signal v1 is simultaneously sampled and held, storing V4 on capacitor C4. The four DC voltages stored on the four capacitors represent the following instantaneous voltage components of signals v1 and v2:

$V1$=Voltage across $Rc$ and $Rd+V_{th-c}$ when current is flowing through compensating element.

$V2$=Voltage across $Rs+V_{th-s}$ when current is flowing through sensing element.

$V3$=Voltage across $Rs+V_{th-s}$ when current is flowing through compensating element.

$V4$=Voltage across $Rc$ and $Rd+V_{th-c}$ when current is flowing through sensing element.

$V_{th-c}$ is the undesirable thermoelectric voltage that occurs when measuring the voltage on the compensating element, and $V_{th-s}$ is the undesirable thermoelectric voltage that occurs when measuring the voltage on the sensing element.

Instrumentation amplifiers A2 and A3, which have equal gains, produce an output voltage proportional to V1−V4 and V2−V3, respectively. The effects of $V_{th-c}$ and $V_{th-s}$ are both eliminated in the outputs of these two amplifiers. These two amplifier outputs are kept equal using high-gain integrating amplifier A1 and dependent current source I1 in a feedback loop just as in the method described previously. This assures that Rs=Rc+Rd.

The sensing element heating voltage is sensed by measuring the differential voltage V2–V3, also eliminating the effect of $V_{th-s}$. Thus, the thermoelectric errors are eliminated in both the control and the measurement functions using this improved method.

Some designs present the problem that a fixed resistor cannot be placed in series with the compensating element in such a way that avoids the consequences of uncontrolled stray resistance in the connection path. This problem was addressed in FIG. 8 of U.S. Pat. No. 6,658,941 by summing three differential voltages into the integrating amplifier instead of two, and that approach can similarly be used here. However, the present switched design allows for the alternative approach of FIG. 4. The circuit of FIG. 4 causes the correct current to be applied to both elements in a manner that causes the sensing element to increase resistance by a constant number of ohms above that of the compensating element.

Figure 4:
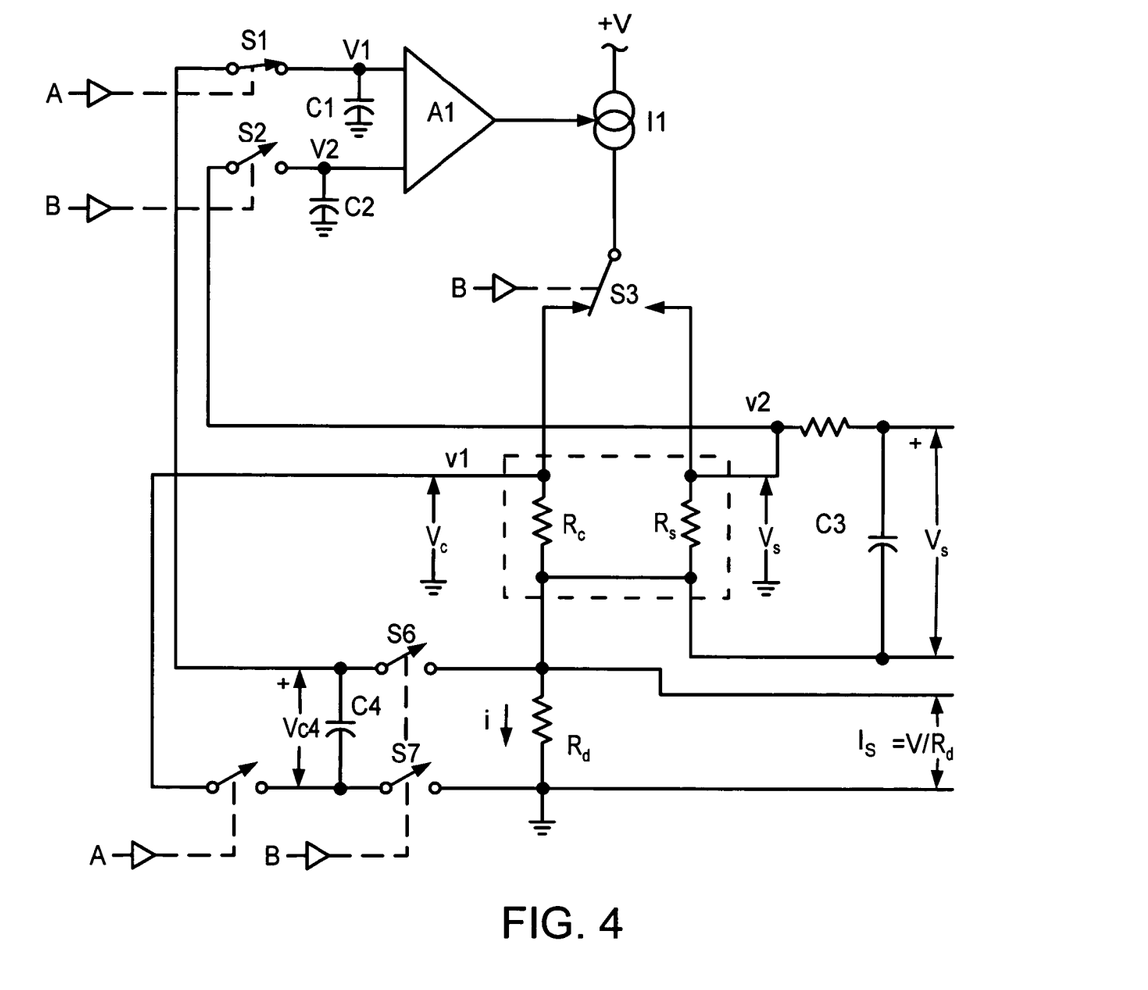
FIG. 4 illustrates another embodiment to avoid the effects of stray resistance in connection paths.

In the switched design, the excitation current is passed through a fixed resistor, and the voltage across this fixed resistor is added to the sampled voltage from the connection to the compensating element. This can be done in a number of ways, but the method illustrated in FIG. 4 is to use a "switched capacitor" technique where a floating capacitor is charged to the voltage across the fixed resistor during the longer phase of the current duty cycle. Through an arrangement of switches, this capacitor is connected in series with the sensed voltage on the compensating element during the shorter phase of the current duty cycle in order to charge the sample-and-hold capacitor for the compensating element voltage to the sum of the two voltages. This is accomplished by adding three analog switches and a capacitor to the original circuit.

This new method has the potential of providing higher performance in addition to reduced cost. The previous DC methods are subject to thermoelectric errors that result from small temperature gradients. This method has the advantage of producing higher voltage signal levels, making the thermoelectric errors smaller relative to the signal levels. In addition, there is no signal level loss when the power ratio is increased as there is with the prior methods. Thus, the compensating element can be operated at a much lower power level in proportion to that of the sensing element, reducing undesirable heat dissipation. Since this method operates in a pulsed mode, further performance improvement can be achieved by using the AC measurement technique of FIG. 4, eliminating all thermoelectric instabilities. An important advantage of increasing instrument performance is the added pressure range that can be realized.

In FIG. 4, the fixed resistance Rd is in series with both the sensing and compensating elements Rs and Rc. Thus, the voltage across that resistor has a common level present in both signals v2 and v1. The circuit of FIG. 4 additionally adds the voltage across Rd to the sampled peak value of v1 to become comparable to the prior designs. To that end, as current flows through Rs and Rd, the voltage across Rd is stored on C4 by closing switches S6 and S7. In the subsequent portion of the cycle when current flows through Rc and Rd, the switches S6 and S7 are open so that the capacitor C4 is connected in series with the circuit from v1 to S1. Thus, the voltage stored on C1 is the sum of the peak value of v1 and $V_{C4}$.

Figure 5:
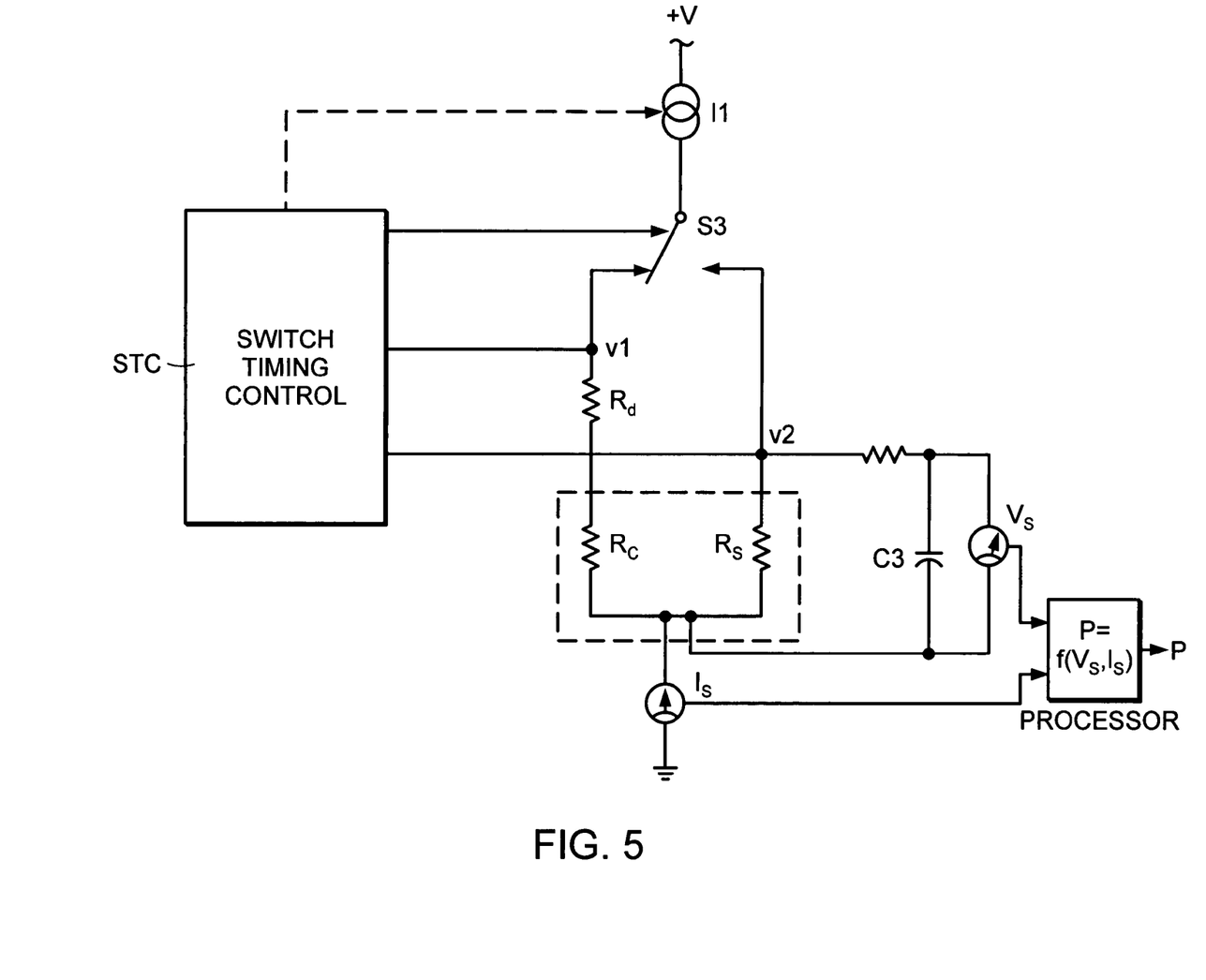
FIG. 5 illustrates another embodiment that varies current duty cycle.

Yet another embodiment is presented in FIG. 5. FIG. 5 corresponds to a modification of the circuit of FIG. 1, but this approach can be applied to any of the prior embodiments. In this circuit, the switch timing control STC, which may be a primarily digital circuit, responds to the voltages v1 and v2 to determine the appropriate time-lengths during which switch S3 is connected to the sensing element Rs and to the compensating element Rc. In this approach, the current through current source I1 may be held constant as the relative lengths of the pulses applied to Rs and Rc are controlled.

The time-length of the current pulse to the sensing element Rs, compared to the pulse to the compensating element Rc, is the control parameter that preferentially heats the sensor to a specified resistance. The magnitude of the current pulses would be fixed and would be the same for both Rs and Rc. The time-length of the pulse to Rc would typically be fixed, but could be variable.

In yet another implementation indicated by the broken line from the switch timing control STC to the current source I1, both the level of current through the current source is controlled and the lengths of the pulses to Rs and Rc are controlled.

While this invention has been particularly shown and described with references to preferred embodiments thereof, it will be understood by those skilled in the art that various changes in form and details may be made therein without departing from the scope of the invention encompassed by the appended claims. For example, although the sensing resistance element and compensating resistance element typically are nearly matching, some intentional mismatch may be advantageous as taught in U.S. Published Application No. US-2003-0097876-A1, incorporated by reference in its entirety.

What is claimed is:

1. A heat loss gauge for measuring gas pressure in an environment comprising:

a resistive sensing element exposed to the environment;

a resistive compensating element in circuit with the sensing element and exposed to the environment;

an electrical source connected to switch current between the sensing element and compensating element, with current applied to the sensing element over a longer duty cycle relative to the current applied to the resistive compensating element to heat the sensing element relative to the compensating element; and measuring circuitry for determining gas pressure in the environment to which the sensing element and compensating element are exposed based on electrical response of the sensing element and the compensating element.

2. The gauge of claim 1 wherein the current to the sensing and compensating element is switched from a common current source.

3. The gauge of claim 1 wherein the gas pressure is determined based on heating current through the sensing element and/or resulting voltage across the sensing element.

4. The gauge of claim 1 wherein the compensating element is in series with a fixed resistive element.

5. The gauge of claim 4 wherein the electrical source applies current to heat the sensing element to a temperature at which the resistance of the sensing element matches the combined resistance of the compensating element and the fixed resistive element.

6. The gauge of claim 4 wherein a voltage across the compensating element and fixed resistive element is compared to a voltage across the sensing element to control the switched current.

7. The gauge of claim 4 wherein the fixed resistive element is in series with both the sensing element and the compensating element and a voltage across the fixed resistive element is added to a voltage across the compensating element and fixed resistive element for comparison to a voltage across the sensing element and fixed resistive element to control the switched current.

8. The gauge of claim 1 wherein the electrical source applies current to heat the sensing element to a temperature at which the resistance of the sensing element matches the combined resistance of the compensating element plus a fixed resistance.

9. The gauge of claim 1 wherein current is applied to the sensing element and compensating element at fixed duty cycles and current level is controlled.

10. The gauge of claim 1 wherein the applied current is fixed and duty cycle of current to at least one of the sensing element and compensating element is controlled.

11. The gauge of claim 1 wherein both applied current and duty cycle of at least one of the sensing element and compensating element are controlled.

12. A method of measuring gas pressure in an environment comprising:
switching current between a resistive sensing element and a resistive compensating element exposed to the environment, the current being applied to the sensing element over a longer duty cycle relative to the current applied to the resistive compensating element to heat the sensing element relative to the compensating element; and
determining gas pressure in the environment based on electrical response of the sensing element and the compensating element.

13. The method of claim 12 wherein the current to the sensing and compensating element is switched from a common current source.

14. The method of claim 12 wherein the gas pressure is determined based on heating current through the sensing element and/or resulting voltage across the sensing element.

15. The method of claim 12 wherein the compensating element is in series with a fixed resistive element.

16. The method of claim 15 wherein the electrical source applies current to heat the sensing element to a temperature at which the resistance of the sensing element matches the combined resistance of the compensating element and the fixed resistive element.

17. The method of claim 15 wherein a voltage across the compensating element and fixed resistive element is compared to a voltage across the sensing element to control the switched current.

18. The method of claim 15 wherein the fixed resistive element is in series with both the sensing element and the compensating element and the voltage across the fixed resistive element is added to the voltage across the compensating element and fixed resistive element for comparison to the voltage across the sensing element and fixed resistive element to control the switched circuit.

19. The method of claim 12 wherein the electrical source applies current to heat the sensing element to a temperature at which the resistance of the sensing element matches the combined resistance of the compensating element plus a fixed resistance.

20. The method of claim 12 wherein current is applied to the sensing element and compensating element at fixed duty cycles and current level is controlled.

21. The method of claim 12 wherein the applied current is fixed and duty cycle of current to at least one of the sensing element and compensating element is controlled.

22. The method of claim 12 wherein both applied current and duty cycle of at least one of the sensing element and compensating element are controlled.

23. A heat loss gauge for measuring gas pressure in an environment comprising:
means for switching current between a resistive sensing element and a resistive compensating element exposed to the environment, the current being applied to the sensing element over a longer duty cycle relative to the current being applied to the resistive compensating element to heat the sensing element relative to the compensating element; and
processing means for determining gas pressure in the environment based on electrical response of the sensing element and the compensating element.

* * * * *